US011340882B2

(12) United States Patent
Gore et al.

(10) Patent No.: US 11,340,882 B2
(45) Date of Patent: May 24, 2022

(54) SYSTEMS AND METHODS FOR ENFORCING UPDATE POLICIES WHILE APPLYING UPDATES FROM BOOTABLE IMAGE FILE

(71) Applicant: Dell Products L.P., Round Rock, TX (US)

(72) Inventors: Santosh Gore, Bangalore (IN); Raveendra Babu Madala, Bangalore (IN); Soorej Ponnandi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 16/237,887

(22) Filed: Jan. 2, 2019

(65) Prior Publication Data

US 2020/0210166 A1 Jul. 2, 2020

(51) Int. Cl.
*G06F 9/44* (2018.01)
*G06F 8/65* (2018.01)
*G06F 9/4401* (2018.01)
*G06F 8/61* (2018.01)

(52) U.S. Cl.
CPC ................ *G06F 8/65* (2013.01); *G06F 8/63* (2013.01); *G06F 9/4408* (2013.01)

(58) Field of Classification Search
CPC ............ G06F 8/65; G06F 8/63; G06F 9/4408
See application file for complete search history.

(56) References Cited

U.S. PATENT DOCUMENTS

| 8,984,502 | B2* | 3/2015 | Culter | G06F 8/65 |
| | | | | 717/171 |
| 2005/0228888 | A1* | 10/2005 | Mihm | G06F 8/65 |
| | | | | 709/227 |
| 2005/0229173 | A1* | 10/2005 | Mihm | G06F 8/65 |
| | | | | 717/171 |
| 2008/0184218 | A1* | 7/2008 | Largman | G06F 21/575 |
| | | | | 717/168 |

* cited by examiner

*Primary Examiner* — Lewis A Bullock, Jr.
*Assistant Examiner* — Mohammad H Kabir
(74) *Attorney, Agent, or Firm* — Jackson Walker L.L.P.

(57) ABSTRACT

An information handling system may include a host system processor and a computer-readable storage medium communicatively coupled to the host system processor and having stored thereon a bootable update image file for performing a firmware update associated with the information handling system. The bootable update image file may be configured to, when read and executed by the processor, read policy settings stored within the information handling system setting forth update policies to be applied during application of updates defined within the bootable update image file and perform updates defined within the bootable update image file in accordance with the update policies.

12 Claims, 4 Drawing Sheets

SYSTEMS AND METHODS FOR ENFORCING UPDATE POLICIES WHILE APPLYING UPDATES FROM BOOTABLE IMAGE FILE

TECHNICAL FIELD

The present disclosure relates in general to information handling systems, and more particularly to methods and systems for enforcing update policies while applying updates from a bootable image file.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To enable a single and simplified process for performing basic input/output system (BIOS) and firmware updates on an information handling system, a bootable update image file with operating system specific update content may be published. However, use of such a bootable update image file may come with challenges. For example, a sequence in which updates are applied may vary from system to system and may vary based on context of the update. As another example, if new component support is to be added in an update, then a particular resource of an information handling system (e.g., a BIOS or management controller) may require updating first. However, traditional approaches do not provide an easy mechanism for providing for defining an order of application of updates. In addition, in some instances it may be desirable to exclude portions of an update image, and traditional approaches do not provide an easy mechanism for providing for such exclusion.

SUMMARY

In accordance with the teachings of the present disclosure, the disadvantages and problems associated with applying updates from a bootable image file may be reduced or eliminated.

In accordance with embodiments of the present disclosure, an information handling system may include a host system processor and a computer-readable storage medium communicatively coupled to the host system processor and having stored thereon a bootable update image file for performing a firmware update associated with the information handling system. The bootable update image file may be configured to, when read and executed by the processor, read policy settings stored within the information handling system setting forth update policies to be applied during application of updates defined within the bootable update image file and perform updates defined within the bootable update image file in accordance with the update policies.

In accordance with these and other embodiments of the present disclosure, a method may include, in an information handling system comprising a host system processor and a computer-readable storage medium communicatively coupled to the host system processor and having stored thereon a bootable update image file for performing a firmware update associated with the information handling system: reading, by the bootable update image file, policy settings stored within the information handling system setting forth update policies to be applied during application of updates defined within the bootable update image file and performing, by the bootable update image file, updates defined within the bootable update image file in accordance with the update policies.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host system processor and a computer-readable storage medium communicatively coupled to the host system processor and having stored thereon a bootable update image file for performing a firmware update associated with the information handling system: read, by the bootable update image file, policy settings stored within the information handling system setting forth update policies to be applied during application of updates defined within the bootable update image file and perform, by the bootable update image file, updates defined within the bootable update image file in accordance with the update policies.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
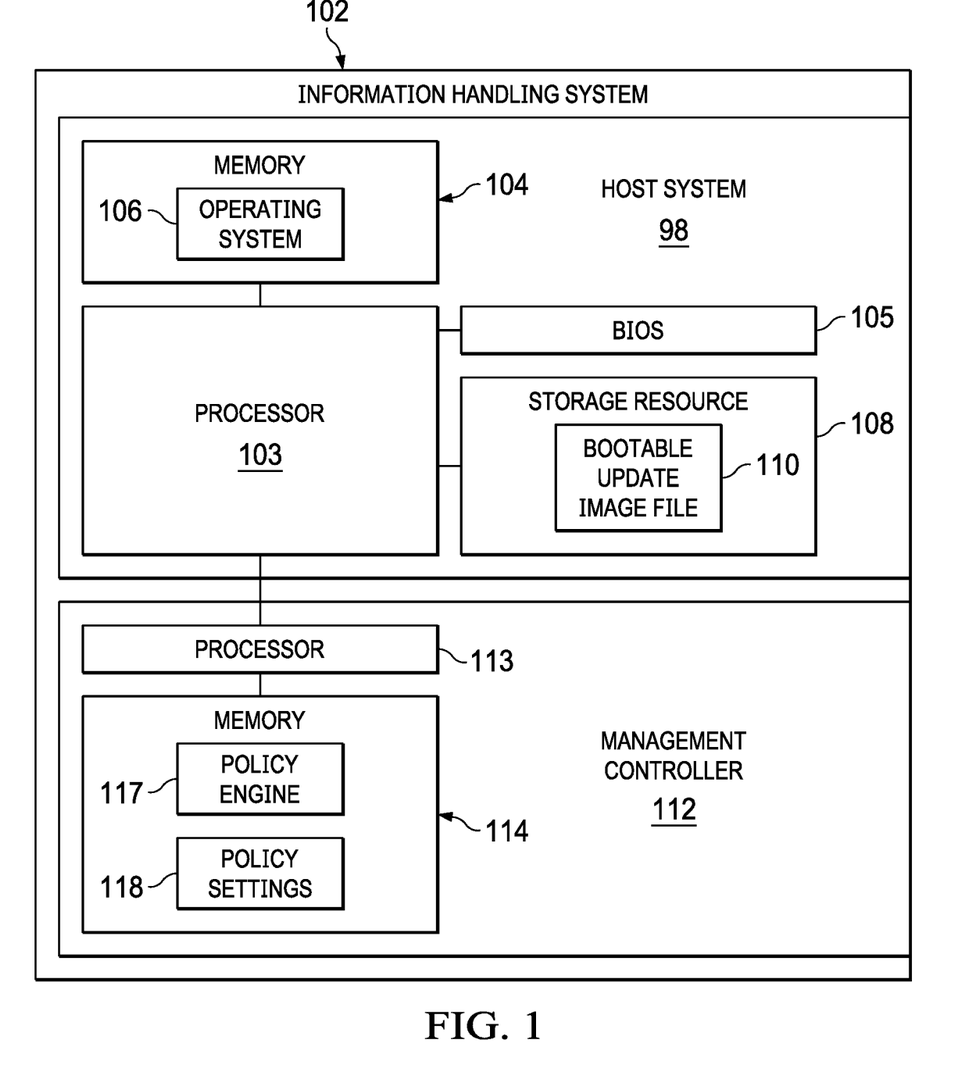
FIG. 1 illustrates a block diagram of an example information handling system, in accordance with embodiments of the present disclosure.
Figure 2:
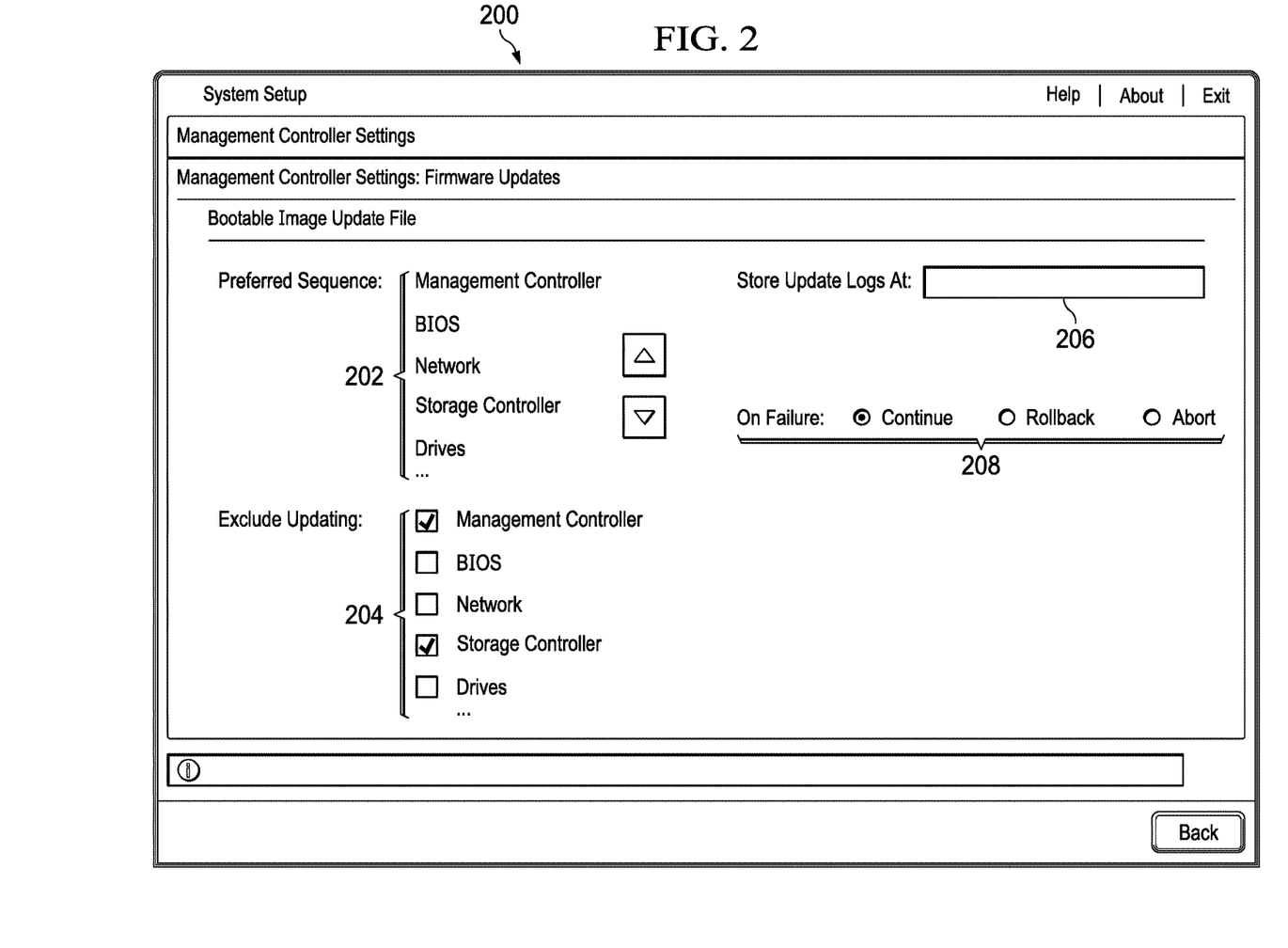
FIG. 2 illustrates an example user interface screen that may be displayed to a user of the information handling system shown in FIG. 1 to allow the user to establish update policies, in accordance with embodiments of the present disclosure.
Figure 3A:
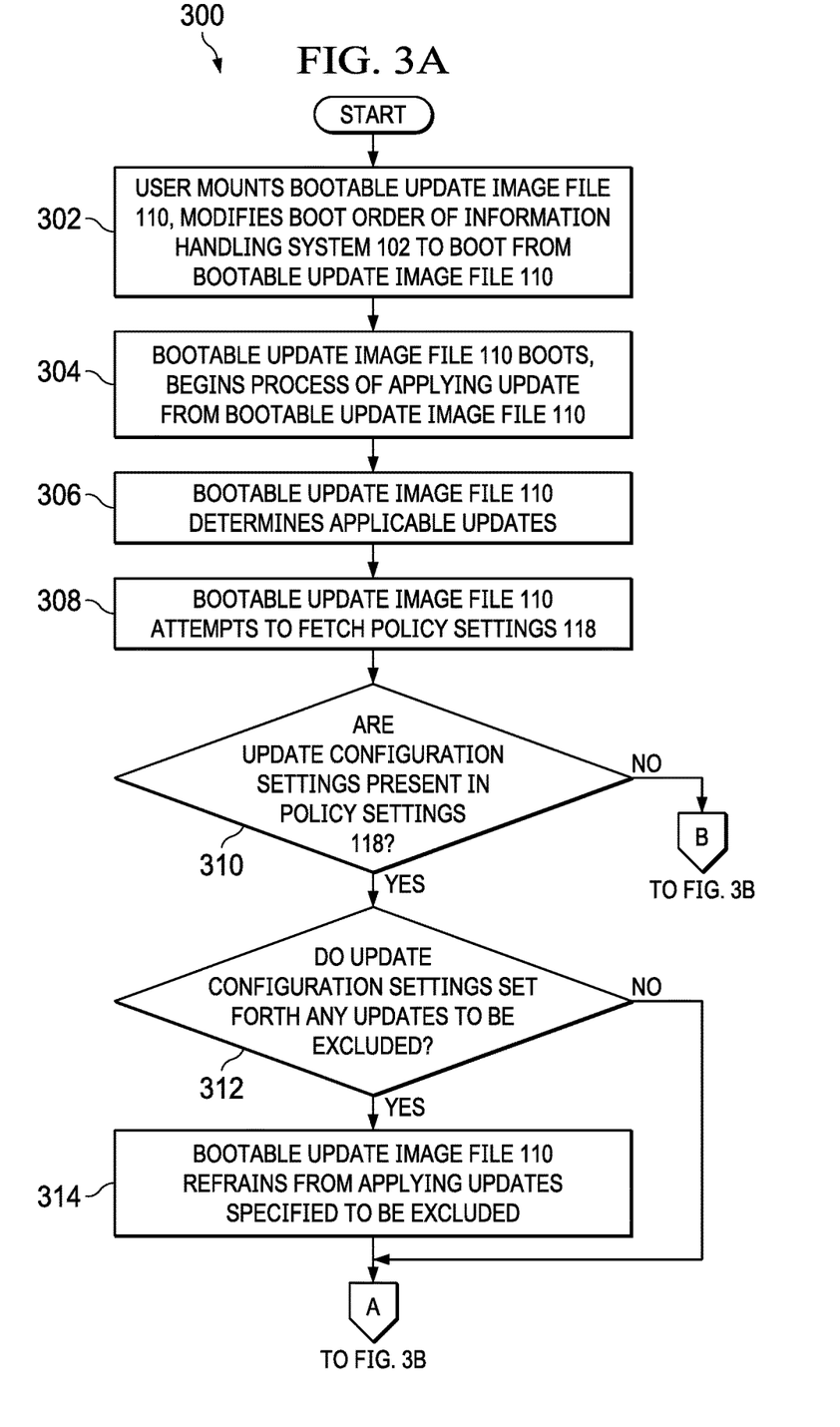
FIGS. 3A and 3B illustrate a flow chart of an example method for enforcing update policies while applying updates from a bootable update image file, in accordance with embodiments of the present disclosure.
Figure 3B:
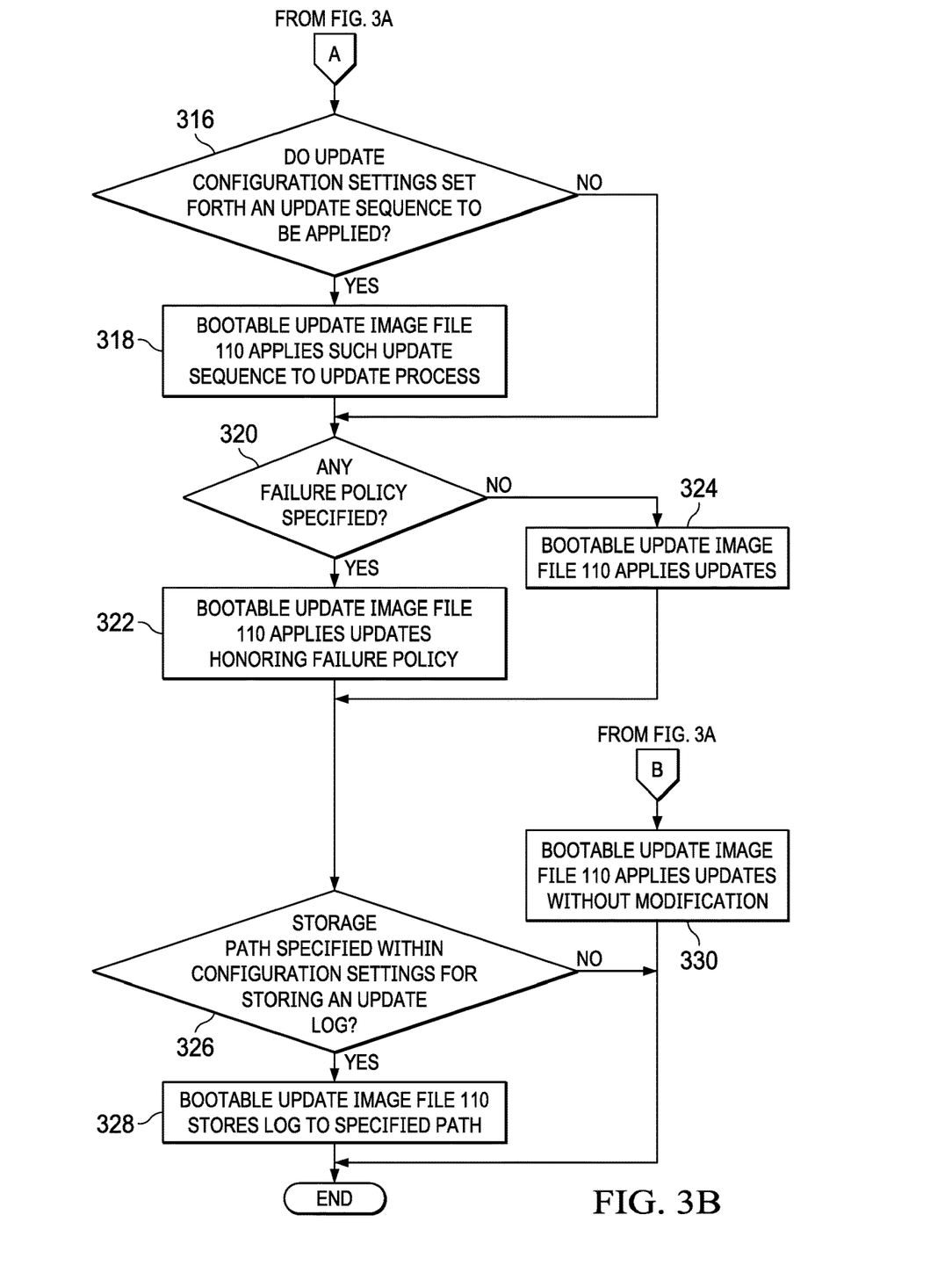

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a storage resource 108 communicatively coupled to processor 103, and a management controller 112 communicatively coupled to processor 103. In operation, processor 103, memory 104, BIOS 105, and storage resource 108 may comprise at least a portion of a host system 98 of information handling system 102. For purposes of clarity and exposition, information handling system 102 has been depicted to comprise only a single host system 98. In some embodiments, information handling system 102 may comprise a plurality of host systems 98.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Active portions of operating system 106 may be transferred to memory 104 for execution by processor 103. Although operating system 106 is shown in FIG. 1 as stored in memory 104, in some embodiments operating system 106 may be stored in storage media accessible to processor 103 (e.g., storage resource 108 and/or other storage media), and active portions of operating system 106 may be transferred from such storage media to memory 104 for execution by processor 103

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Storage resource 108 may be communicatively coupled to processor 103 and may include any system, device, or apparatus operable to store information processed by processor 103. Storage resource 108 may include, for example, network attached storage, one or more direct access storage devices (e.g., hard disk drives), one or more optical media drives (e.g., CD-ROM, DVD drives, Blu-Ray disk drive, etc.), and/or one or more sequential access storage devices (e.g., tape drives).

As shown in FIG. 1, storage resource 108 may have stored thereon a bootable update image file 110. Bootable update image file 110 may comprise a disk image which is bootable and which includes updates for BIOS 105 and firmware of information handling system 102. In some embodiments, bootable update image file 110 may comprise a disk image of an optical disc comprising an archive file that includes all information that would be written to an optical disc, sector by sector, including the optical disc file system (e.g., an ISO image file).

Management controller 112 may be configured to provide management facilities for management of information handling system 102. Such management may be made by management controller 112 even if information handling system 102 is powered off or powered to a standby state. Management controller 112 may include a processor 113 and a memory 114. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), Peripheral Component Interconnect Express (PCIe) bus, and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. As shown in FIG. 1, memory 114 may have stored thereon a policy engine 117 and policy settings 118.

Policy engine 117 may comprise a program of instructions which may be read and executed by processor 113 and may be configured to accept and enforce update policies associated with updates applied by bootable image update file 110. In embodiments of information handling system 102 that do not include management controller 112, policy engine 117 may be embodied within BIOS 105 and may be read and executed by processor 103. Functionality of policy engine 117 is disclosed in greater detail below with respect to FIGS. 2 and 3.

Policy settings 118 may comprise a list, map, table, database, and/or data structure stored on memory 114 and setting forth one or more policy parameters defining update policies for updates to be applied from bootable update image file 110. In embodiments of information handling system 102 that do not include management controller 112, policy settings 118 may be embodied within BIOS 105 and may be read by processor 103.

In addition to processor 103, memory 104, storage resource 108, and management controller 112, information handling system 102 may include one or more other information handling resources.

In operation, and as described in greater detail below, policy engine 117 may allow a user (e.g., administrator or end user) of information handling system 102 to establish one or more update policies to use while applying updates via bootable image update file 110, and may operate in concert with bootable image update file 110 to enforce the one or more update policies. Such one or more update policies may include, without limitation, a preferred sequence in which to apply updates from bootable image update file 110, an identification of updates from bootable image update file 110 to be excluded from an update process, and an identification of a resolution to be taken in response to failure of an update from bootable image update file 110.

FIG. 2 illustrates an example user interface screen 200 that may be displayed to a user of information handling system 102 to allow the user to establish update policies, in accordance with embodiments of the present disclosure. In some embodiments, such user interface screen 200 may be displayed locally to information handling system 102, for example on a display device locally coupled to or integral to information handling system 102. In other embodiments, such user interface screen 200 may be displayed remotely from information handling system 102, for example within a management console communicatively coupled to management controller 112 via a network. In some embodiments, policy engine 117 may cause display of user interface screen 200 and may receive user input associated with user interaction with user interface screen 200.

As shown in FIG. 2, user interface screen 200 may include user interface elements 202, 204, 206, and 208 for allowing graphical user interaction with policy engine 117. For example, user interface element 202 may allow a user to establish a preferred sequence for updates to be applied by bootable image update file 110. As another example, user interface element 204 may allow a user to specify some updates of bootable image update file 110 to be excluded during an update process. As a further example, user interface element 206 may allow a user to define a storage path to which data logs associated with an update process may be stored. As an additional example, user interface element 208 may allow a user to determine a resolution or remedial action to take place in the event that an update process associated with bootable image update file 110 fails. Policy engine 117 may receive the various configurations selected by the user within user interface screen 200 and store information regarding such selections in policy settings 118.

FIGS. 3A and 3B illustrate a flow chart of an example method 300 for enforcing update policies while applying updates from bootable update image file 110, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, a user may mount bootable update image file 110 and modify a boot order of information handling system 102 such that information handling system 102 boots from bootable update image file 110.

At step 304, bootable update image file 110 may boot and begin a process of applying updates from bootable update image file 110. At step 306, bootable update image file 110 may determine its applicable updates to be applied to information handling system 102.

At step 308, bootable update image file 110 may attempt to fetch policy settings 118 which embody user-based configurations for applying updates of bootable update image file 110, as described above. At step 310, bootable update image file 110 may determine if update configuration settings are present in policy settings 118. If update configuration settings are present in policy settings 118, method 300 may proceed to step 312. Otherwise, method 300 may proceed to step 330.

At step 312, responsive to the presence of update configuration settings in policy settings 118, bootable update image file 110 may determine if the update configuration settings set forth any updates specified to be excluded. If the update configuration settings set forth any updates specified to be excluded, method 300 may proceed to step 314. Otherwise, method 300 may proceed to step 316.

At step 314, responsive to the update configuration settings setting forth any updates specified to be excluded, bootable update image file 110 may refrain from applying updates specified to be excluded.

At step 316, bootable update image file 110 may determine if the update configuration settings set forth an update sequence to be applied. If the update configuration settings set forth an update sequence to be applied, method 300 may proceed to step 318. Otherwise, method 300 may proceed to step 320.

At step 318, responsive to the update configuration settings setting forth an update sequence to be applied, bootable update image file 110 may apply such sequence to the update.

At step 320, bootable update image file 110 may determine if any failure policy is specified defining a resolution in the event of failure of the update process. If the update configuration settings set forth a failure policy, method 300 may proceed to step 322. Otherwise, method 300 may proceed to step 324.

At step 322, responsive to the update configuration settings setting forth a failure policy, bootable update image file 110 may honor such policy when applying updates during the update process, applying updates as defined within bootable update image file 110 and in accordance with any specified update sequence and exclusions At step 324, responsive to the update configuration settings failing to set forth a failure policy, bootable update image file 110 may apply updates as defined within bootable update image file 110 and in accordance with any specified update sequence and exclusions.

At step 326, bootable update image file 110 may determine if any storage path is specified within the configuration settings for storing an update log. If the update configuration settings set forth a storage path for storing the update log, method 300 may proceed to step 328. Otherwise, method 300 may end.

At step 328, responsive to the update configuration settings setting forth a storage path for storing the update log, bootable update image file 110 may store the log to the specified path. After completion of step 328, method 300 may end.

At step 330, responsive to update configuration settings being absent from policy settings 118, bootable update image file 110 may apply the updates defined within bootable update image file 110 without modification. After completion of step 330, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented in whole or part using bootable update image file 110, policy engine 117, and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system processor; and
   a computer-readable storage medium communicatively coupled to the host system processor configured to:
      mount a bootable update image file, wherein the bootable update image file is for performing a firmware update associated with the information handling system and includes a plurality of updates defined therein;
      modify a boot order of the information handling system to boot from the mounted bootable update image file; and
      boot the information handling system, wherein the booting includes:
         reading policy settings stored within a basic input/output system (BIOS) of the information handling system setting forth update policies to be applied during application of updates defined within the bootable update image file, wherein the update policies include a user-specified order in which updates defined within the bootable update image file are to be applied; and
         performing updates defined within the bootable update image file in accordance with the update policies.

2. The information handling system of claim 1, wherein the update policies define exclusions of one or more updates defined within the bootable update image file.

3. The information handling system of claim 1, wherein the update policies define a resolution action to be applied in the event of failure of updates defined within the bootable update image file.

4. The information handling system of claim 1, wherein the update policies define a storage path for storage of a log associated with application of updates defined within the bootable update image file.

5. A method comprising, in an information handling system comprising a host system processor and a computer-readable storage medium communicatively coupled to the host system processor, performing the steps of:
   mounting a bootable update image file, wherein the bootable update image file is for performing a firmware update associated with the information handling system and includes a plurality of updates defined therein;
   modifying a boot order of the information handling system to boot from the mounted bootable update image file; and
   booting the information handling system, wherein the booting includes:
      reading policy settings stored within a basic input/output system (BIOS) of the information handling system setting forth update policies to be applied during application of updates defined within the bootable update image file, wherein the update policies include a user-specified order in which updates defined within the bootable update image file are to be applied; and
      performing updates defined within the bootable update image file in accordance with the update policies.

6. The method of claim 5, wherein the update policies define exclusions of one or more updates defined within the bootable update image file.

7. The method of claim 5, wherein the update policies define a resolution action to be applied in the event of failure of updates defined within the bootable update image file.

8. The method of claim 5, wherein the update policies define a storage path for storage of a log associated with application of updates defined within the bootable update image file.

9. An article of manufacture comprising:
   a non-transitory computer-readable medium; and
   computer-executable instructions carried on the computer-readable medium, the instructions readable by a processor, the instructions, when read and executed, for causing the processor to, in an information handling system to:
      mount a bootable update image file, wherein the bootable update image file is for performing a firmware update associated with the information handling system and includes a plurality of updates defined therein;
      modify a boot order of the information handling system to boot from the mounted bootable update image file; and
      boot the information handling system, wherein the booting includes:
         reading policy settings stored within a basic input/output system (BIOS) of the information handling system setting forth update policies to be applied during application of updates defined within the bootable update image file, wherein the update policies include a user-specified order in which updates defined within the bootable update image file are to be applied; and
         performing updates defined within the bootable update image file in accordance with the update policies.

10. The article of claim 9, wherein the update policies define exclusions of one or more updates defined within the bootable update image file.

11. The article of claim 9, wherein the update policies define a resolution action to be applied in the event of failure of updates defined within the bootable update image file.

12. The article of claim 9, wherein the update policies define a storage path for storage of a log associated with application of updates defined within the bootable update image file.

* * * * *

UNITED STATES PATENT AND TRADEMARK OFFICE
CERTIFICATE OF CORRECTION

| | |
|---|---|
| PATENT NO. | : 11,340,882 B2 |
| APPLICATION NO. | : 16/237887 |
| DATED | : May 24, 2022 |
| INVENTOR(S) | : Gore et al. |

It is certified that error appears in the above-identified patent and that said Letters Patent is hereby corrected as shown below:

In the Claims

In Column 9, Claim 1, Line 25, delete "processor configured to:" and insert --processor with instructions configured to:--, therefor.

Signed and Sealed this
Twenty-ninth Day of November, 2022

*Katherine Kelly Vidal*

Katherine Kelly Vidal
*Director of the United States Patent and Trademark Office*